United States Patent
Miao et al.

(10) Patent No.: US 11,048,971 B1
(45) Date of Patent: Jun. 29, 2021

(54) METHOD FOR TRAINING IMAGE GENERATION MODEL AND COMPUTER DEVICE

(71) Applicant: Ping An Technology (Shenzhen) Co., Ltd., Shenzhen (CN)

(72) Inventors: Jinghong Miao, San Jose, CA (US); Bo Gong, Belmont, CA (US); Mei Han, Palo Alto, CA (US)

(73) Assignee: Ping An Technology (Shenzhen) Co., Ltd., Shenzhen (CN)

( * ) Notice: Subject to any disclaimer, the term of this patent is extended or adjusted under 35 U.S.C. 154(b) by 51 days.

(21) Appl. No.: 16/726,785

(22) Filed: Dec. 24, 2019

(51) Int. Cl.
*G06K 9/62* (2006.01)

(52) U.S. Cl.
CPC ......... *G06K 9/6234* (2013.01); *G06K 9/6256* (2013.01)

(58) Field of Classification Search
CPC ......... G06T 2207/30168; G06T 7/0002; G06T 2207/30232; G06N 20/00; G06N 3/08
See application file for complete search history.

(56) References Cited

U.S. PATENT DOCUMENTS

| | | | | |
|---|---|---|---|---|
| 6,266,442 B1 * | 7/2001 | Laumeyer | ......... | G06K 9/00818 382/104 |
| 7,813,822 B1 * | 10/2010 | Hoffberg | ......... | H04N 21/44222 700/94 |
| 8,295,565 B2 * | 10/2012 | Gu | ......... | G06T 5/007 382/128 |
| 8,488,862 B2 * | 7/2013 | Bose | ......... | A61N 5/1075 382/132 |
| 8,515,171 B2 * | 8/2013 | Vantaram | ......... | G06T 7/136 382/173 |
| 8,553,088 B2 * | 10/2013 | Stein | ......... | B60Q 1/20 348/148 |
| 9,723,199 B1 * | 8/2017 | Goyal | ......... | H04N 5/232133 |

* cited by examiner

*Primary Examiner* — Yosef Kassa
(74) *Attorney, Agent, or Firm* — ScienBiziP, P.C.

(57) ABSTRACT

In a method for training an image generation model, a first generator generates a first sample matrix, a first converter generates a sample contour image, a first discriminator optimizes the first generator and the first converter, a second generator generates a second sample matrix according to the first sample matrix, a second converter generates a first sample grayscale image, a second discriminator optimizes the second generator and the second converter, a third generator generates a third sample matrix according to the second sample matrix, a third converter generates a second sample grayscale image, a third discriminator optimizes the third generator and the third converter, a fourth generator generates a fourth sample matrix according to the third sample matrix, a fourth converter generates a sample color image, and a fourth discriminator optimizes the fourth generator and the fourth converter. The image generation model can be trained easily.

20 Claims, 13 Drawing Sheets

METHOD FOR TRAINING IMAGE GENERATION MODEL AND COMPUTER DEVICE

FIELD

The subject matter herein generally relates to artificial intelligence, and particularly to a method for training an image generation model and a computer device employing the method.

BACKGROUND

With the development of artificial intelligence, automatic image generation has become popular, and many image generation algorithms have appeared. Generative Adversarial Nets (GAN) is one of the most important image generation methods. Research into GAN has increased. However, because a GAN model is difficult to interpret, parameter adjustment and network structure design of the GAN model are complicated, which makes the GAN model less effective in generating images and hard to train. GAN models often collapse during training, and some generated images are all noise without any useful information. Because it is not due to code errors, but to a structure of the GAN model itself or input and output information, a process of repairing the GAN model is very cumbersome, and it is impossible to use a method of error detection in general software development to conduct error checking. Therefore, the research and application of the GAN model require a lot of money and labor, which makes the growth of the GAN model slow, and the application of the GAN model difficult.

DETAILED DESCRIPTION

In order to provide a clearer understanding of the objects, features, and advantages of the present disclosure, the same are given with reference to the drawings and specific embodiments. It should be noted that the embodiments in the present disclosure and the features in the embodiments may be combined with each other without conflict.

In the following description, numerous specific details are set forth in order to provide a full understanding of the present disclosure. Described embodiments are merely embodiments which are a part of the present disclosure, and do not include every embodiment. All other embodiments obtained by those of ordinary skill in the art based on the embodiments of the present disclosure without creative efforts are within the scope of the claims.

Unless defined otherwise, all technical and scientific terms herein have the same meaning as used in the field of the art technology as generally understood. The terms used in the present disclosure are for the purposes of describing particular embodiments and are not intended to limit the present disclosure.

A method for training an image generation model can be applied to one or more computer devices. A computer device is a device capable of automatically performing numerical calculation and/or information processing according to an instruction set or stored in advance, and the hardware thereof includes, but is not limited to, a microprocessor, an application specific integrated circuit (ASIC), a field-programmable gate array (FPGA), a digital signal processor (DSP), or an embedded device, etc.

The computer device may be a desktop computer, a notebook, a palmtop computer, and a cloud server. The computer device can perform a human-computer interaction with a user through a keyboard, a mouse, a remote controller, a touch panel, or a voice control device.

Figure 1:
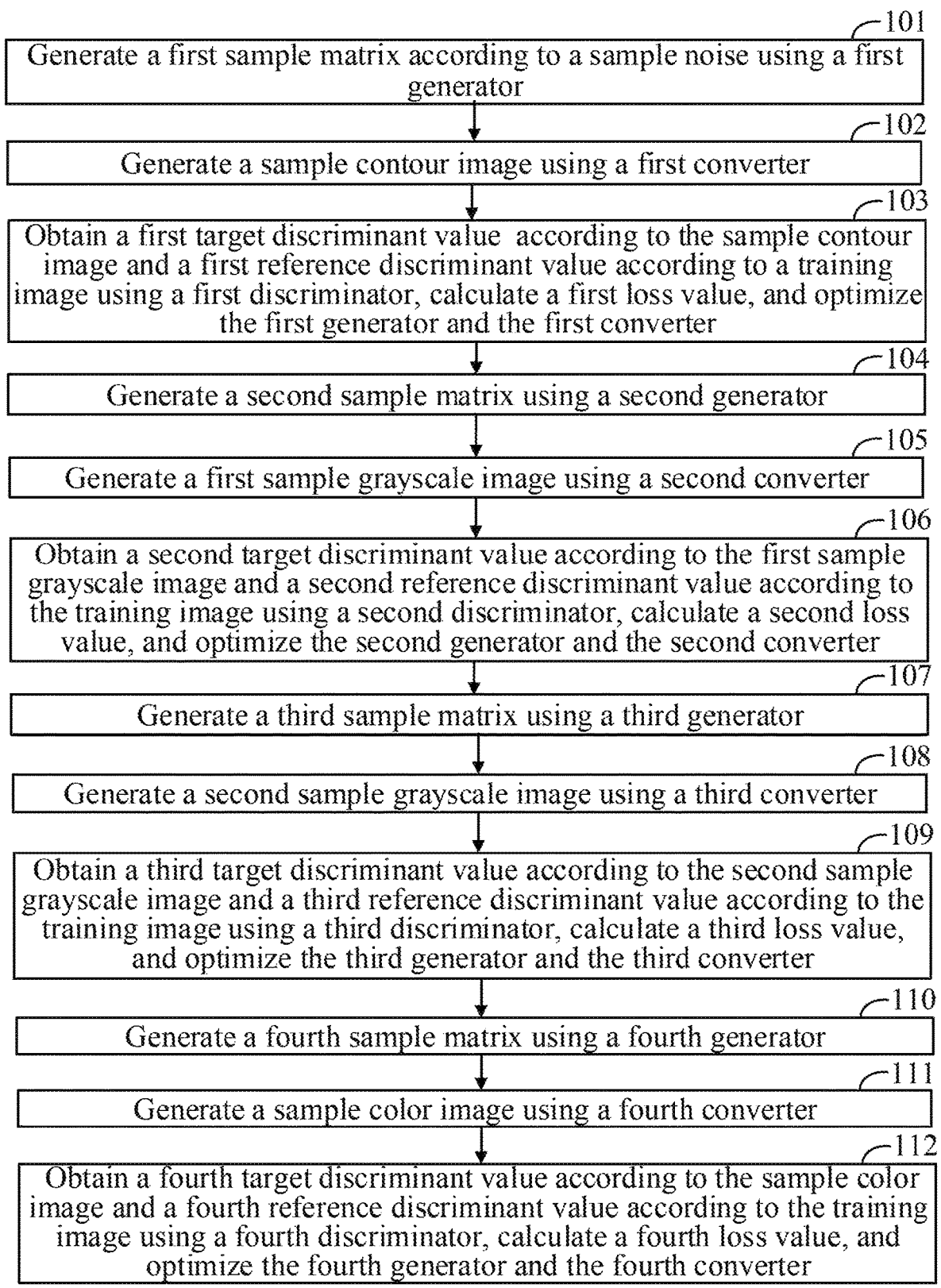
FIG. 1 is a flowchart of a method for training an image generation model in one example embodiment.

FIG. 1 is a flowchart of one example embodiment of a method for training an image generation model. In one embodiment, the method can be executed by a computer device. The method can obtain an improved model for generating high-quality images.

The illustrated order of blocks in FIG. 1 is illustrative only and the order of the blocks can be changed according to different requirements. Additional blocks can be added or fewer blocks may be utilized without departing from this disclosure.

The image generation model of the present disclosure is based on a StackGAN model and is a modified version of the StackGAN model. The StackGAN model is one of Generative Adversarial Nets (GAN). In one embodiment, the image generation model includes four generators (denoted as a first generator, a second generator, a third generator, and a fourth generator), four converters (denoted as a first converter, a second converter, a third converter, and a fourth converter) and four discriminators (denoted as a first discriminator, a second discriminator, a third discriminator, and a fourth discriminator).

Figure 2:
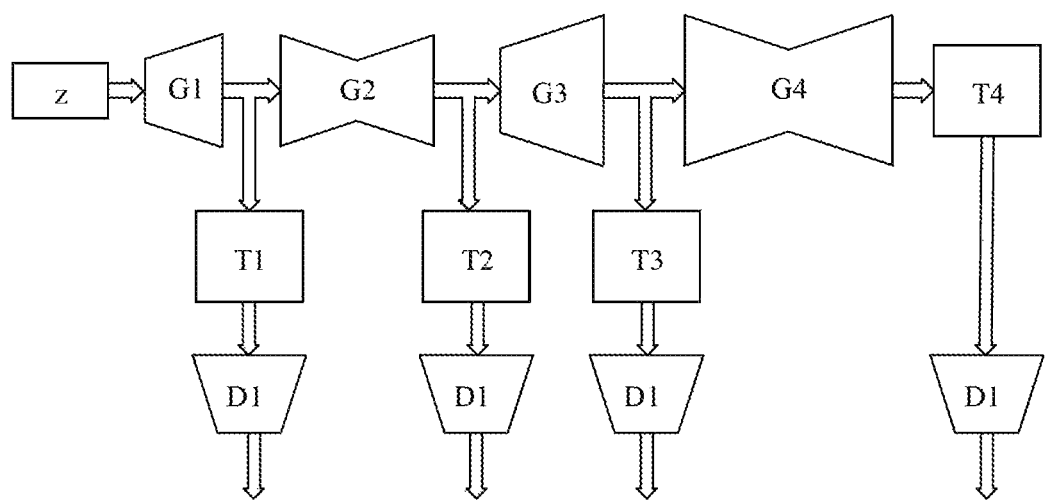
FIG. 2 shows the image generation model in the method of FIG. 1.

FIG. 2 shows the image generation model in the method of FIG. 1, where "z" is a sample noise input to the image generation model of the present disclosure. "G1", "G2", "G3", and "G4" are the first generator, the second generator, the third generator, and the fourth generator, respectively. "T1", "T2", "T3", and "T4" are the first converter, the second converter, the third converter, and the fourth converter, respectively. "D1", "D2", "D3", and "D4" are the first discriminator, the second discriminator, the third discriminator, and the fourth discriminator, respectively.

As shown in FIG. 1 and FIG. 2, the method for training the image generation model is as follows:

At block 101, the first generator may generate a first sample matrix according to the sample noise. The first sample matrix may include contour information.

After the sample noise is input to the first generator, the first sample matrix may be generated by the first generator.

The sample noise may be a row matrix. Elements in the row matrix may be random numbers between 0 and 1 which obey a Gaussian distribution. In one embodiment, the sample noise may be a 1×100 matrix.

The first sample matrix may be a small size matrix, such as a 64×64×64 matrix.

The first generator may include a fully connected layer and multiple upsampling blocks. In one embodiment, the first generator may include four upsampling blocks.

Figure 3:
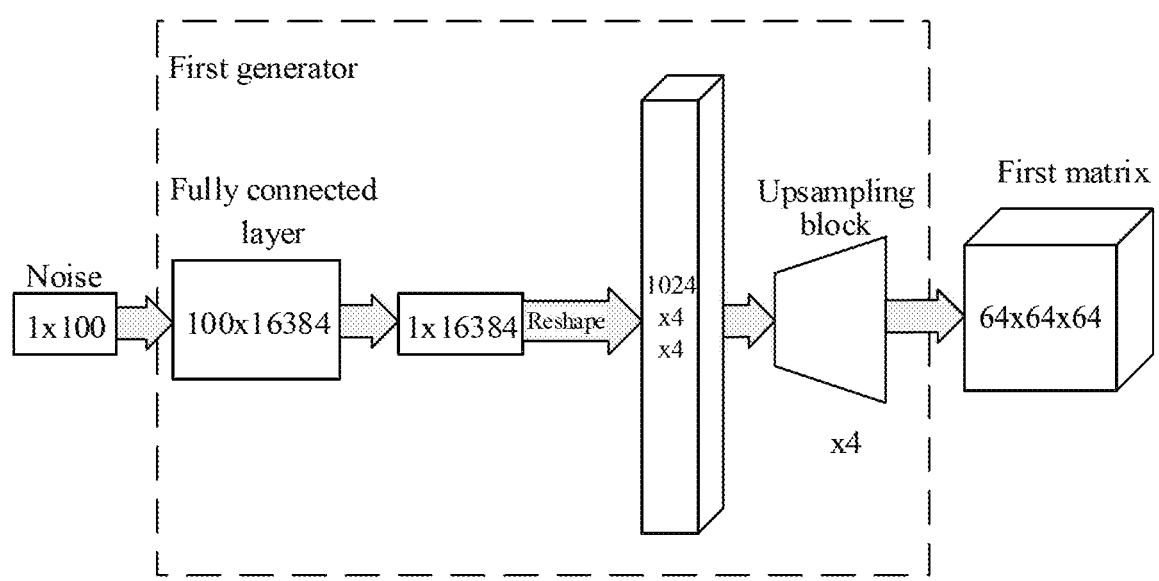
FIG. 3 shows a first generator in the method of FIG. 1.

A process of generating the first sample matrix according to the sample noise using the first generator is illustrated in FIG. 3.

At block 102, the first converter may generate a sample contour image according to the first sample matrix.

The sample contour image may be a low-resolution image, such as a 3×64×64 image.

The first converter may include a convolution layer and an activation function. In one embodiment, a convolutional kernel of the first converter may be of 3×3×3 size with padding of one and a stride of one. The activation function of the first converter may be a tanh function. The convolution layer of the first converter may reduce a depth of the first sample matrix, while keeping a length and a width of the first sample matrix unchanged. The activation function of the first converter may obtain the sample contour image. For example, the convolutional layer of the first converter may convert a 64×64×64 first sample matrix to a 3×64×64 matrix. The tanh function of the first converter may convert the 3×64×64 matrix to a 3×64×64 sample contour image.

Figure 7:
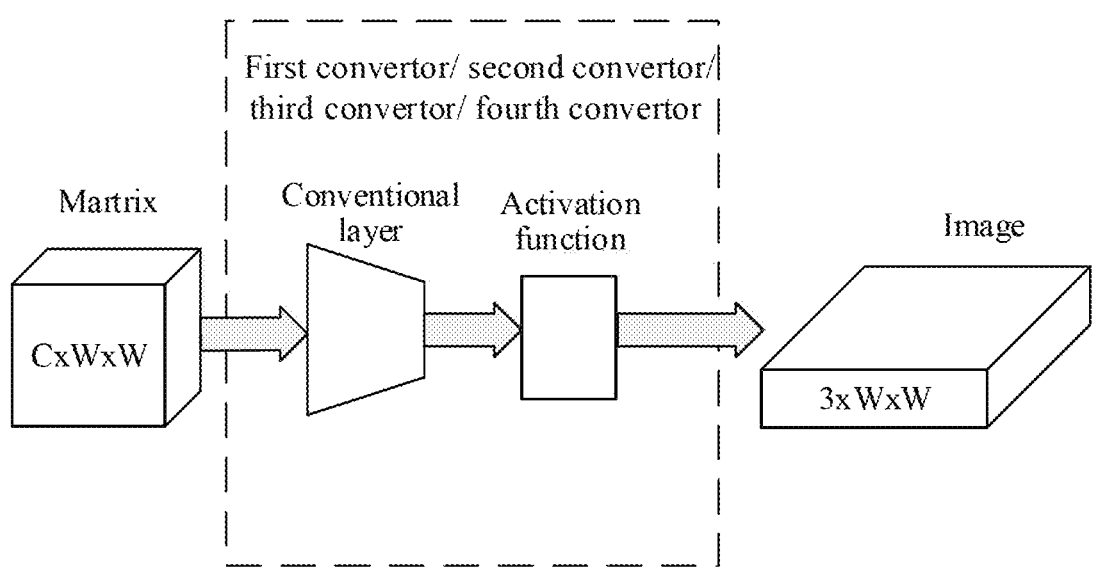
FIG. 7 shows a first converter, a second converter, a third converter, and a fourth converter in the method of FIG. 1.

A process of generating the sample contour image according to the first sample matrix using the first converter is illustrated in FIG. 7.

At block 103, the first discriminator may obtain a first target discriminant value according to the sample contour image, and obtain a first reference discriminant value according to a training image. A first loss value may be calculated according to the first target discriminant value and the first reference discriminant value, and the first generator and the first converter may be optimized according to the first loss value.

Figure 8:
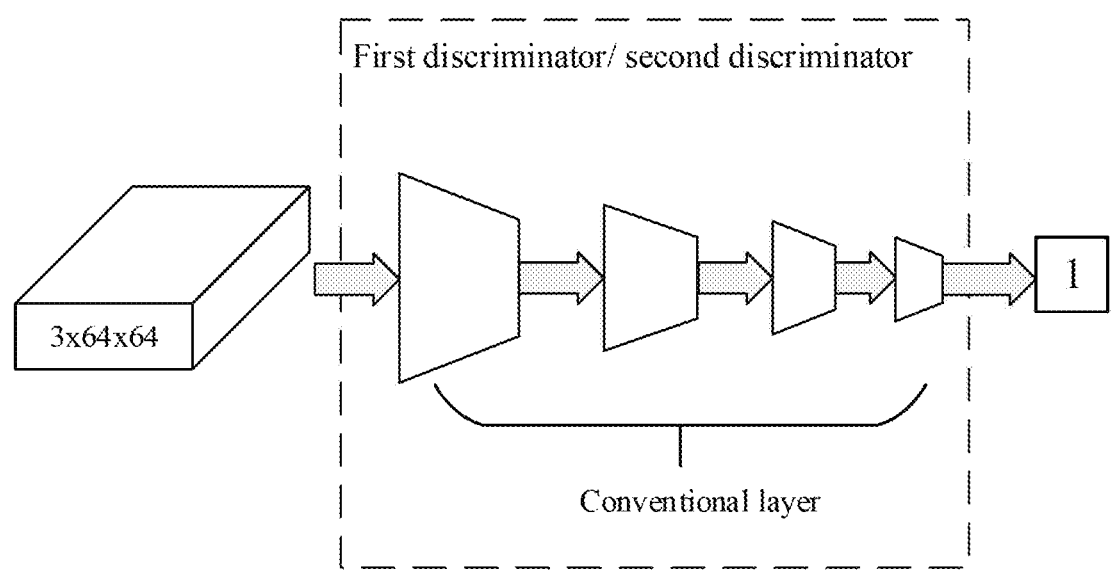
FIG. 8 shows a first discriminator and a second discriminator in the method of FIG. 1.

The first discriminator may include multiple convolution layers. In one embodiment, the first discriminator may include four convolution layers. A structure of the first discriminator is shown in FIG. 8.

Alternatively, the first discriminator may include multiple convolution layers and a fully connected layer. For example, the first discriminator may include three convolution layers and a fully connected layer.

After the sample contour image is input to the first discriminator, the first discriminator may gradually reduce a size of the sample contour image to obtain the first target discriminant value.

After a reference contour image derived from the training image is input to the first discriminator, the first discriminator may gradually reduce a size of the reference contour image to obtain the first reference discriminant value.

The reference contour image may be a contour image obtained from the training image and of a same size as the sample contour image.

Training images are selected according to an application scenario of the image generation model. For example, if the image generation model is used to generate face images, the training images may be face images. If the image generation model is used to generate natural landscape images, the training images may be natural landscape images.

In one embodiment, the first loss value may be a WGAN-GP (Wasserstein GAN with gradient penalty) loss.

Optionally, the first loss value may be calculated as follows:

$$D_{loss}=E_z(D(G(z)))-E_x(D(x))+GP$$

$$GP=\lambda *E_{x\sim P(\tilde{x})}(\|\nabla_z D(x)\|_2-1)^2$$

$$\tilde{x}=\varepsilon G(z)+(1-\varepsilon)*X$$

In the above equations, "ε" represents a random number between 0 and 1. "λ" is an empirical value and is usually taken as 0.5. "E" denotes an expected value, "x" denotes a training image, "D)" denotes a result of a discriminator (such as the first discriminator), and "G( )" denotes an image (such as the sample contour image) generated by a converter (such as the first converter) corresponding to the discriminator.

$E_{x\sim P(\tilde{x})}(\|\nabla_z D(x)\|_2-1)^2$ denotes that after "x" is input to the discriminator, a norm of each parameter is subtracted from 1 and all results are added so that a gradient of all parameters of the discriminator is close to 1, to stabilize the training.

The first generator and the first converter may be optimized using a back-propagation (BP) algorithm.

At block 104, the second generator may generate a second sample matrix according to the first sample matrix. The second sample matrix may include low frequency grayscale information.

After the first sample matrix is input to the second generator, the second sample matrix may be generated by the second generator.

The second sample matrix may be of a same size as the first sample matrix. For example, the first sample matrix is a 64×64×64 matrix, and the second sample matrix is also a 64×64×64 matrix.

The second generator may include a convolutional layer, multiple residual blocks, and an upsampling block. In one embodiment, the second generator may include three residual blocks.

A residual block is a basic module in a residual network. A residual block may include two convolutional layers. In one embodiment, a convolutional kernel of the convolutional layer of the residual block may be of 3×3×C size with padding of one and a stride of one, where C is a depth of an input matrix.

Figure 4:
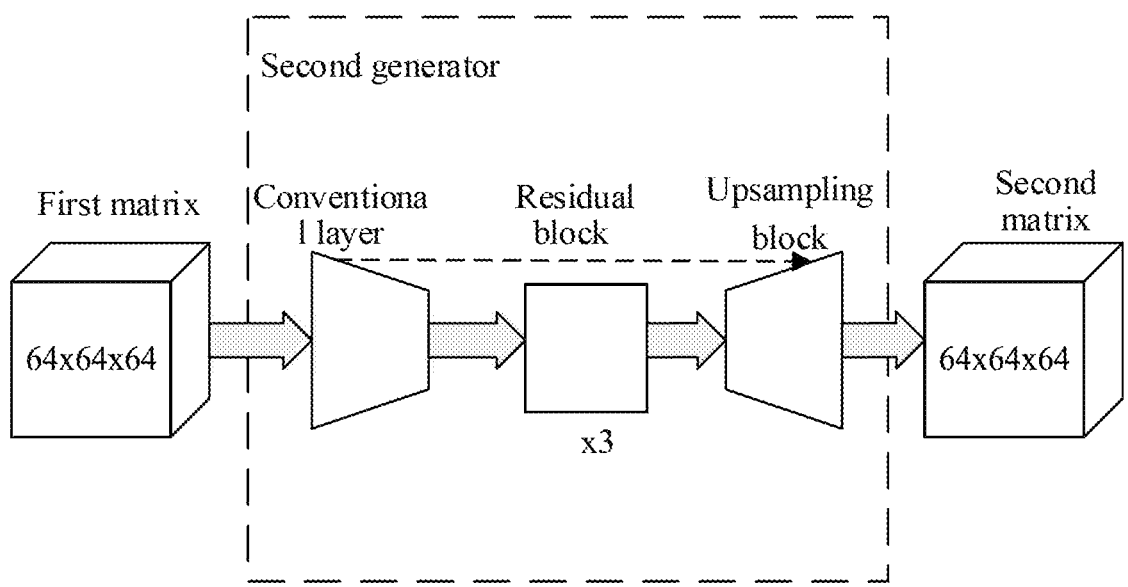
FIG. 4 shows a second generator in the method of FIG. 1.

A process of generating the second sample matrix according to the first sample matrix using the second generator is illustrated in FIG. 4.

At block 105, the second converter may generate a first sample grayscale image according to the second sample matrix.

The first sample grayscale image may be a low-resolution grayscale image, such as a 3×64×64 grayscale image.

A resolution of the first sample grayscale image may be same as the sample contour image. For example, resolutions of the first sample grayscale image and the sample contour image are 64×64.

The second converter may include a convolution layer and an activation function. A structure of the second converter may be same as the first converter. In one embodiment, a convolutional kernel of the second converter may be of 3×3×3 size with padding of one and a stride of one. The activation function of the second converter may be a tanh function. The convolution layer of the second converter may reduce a depth of the second sample matrix, while keeping a length and a width of the second sample matrix unchanged. The activation function of the second converter may obtain the first sample grayscale image. For example, the convolutional layer of the second converter may convert a 64×64×

64 second sample matrix to a 3×64×64 matrix. The tanh function of the second converter may convert the 3×64×64 matrix to a 3×64×64 first sample grayscale image.

A process of generating the first sample grayscale image according to the second sample matrix using the second converter is illustrated in FIG. 7.

At block 106, the second discriminator may obtain a second target discriminant value according to the first sample grayscale image, and obtain a second reference discriminant value according to the training image. A second loss value may be calculated according to the second target discriminant value and the second reference discriminant value, and the second generator and the second converter may be optimized according to the second loss value.

In one embodiment, a structure of the second discriminator may be same as the first discriminator.

The second discriminator may include multiple convolution layers. In one embodiment, the second discriminator may include four convolution layers. A structure of the second discriminator is shown in FIG. 8.

Alternatively, the second discriminator may include multiple convolution layers and a fully connected layer. For example, the second discriminator may include three convolution layers and a fully connected layer.

After the first sample grayscale image is input to the second discriminator, the second discriminator may gradually reduce a size of the first sample grayscale image to obtain the second target discriminant value.

After a first reference grayscale image corresponding to the training image is input to the second discriminator, the second discriminator may gradually reduce a size of the first reference grayscale image to obtain the second reference discriminant value.

The first reference grayscale image may be a grayscale image obtained from the training image and of a same size as the first sample grayscale image.

In one embodiment, the second loss value is a WGAN-GP loss.

A calculation method of the second loss value may refer to the first loss value.

The second generator and the second converter may be optimized using a back-propagation (BP) algorithm.

At block 107, the third generator may generate a third sample matrix according to the second sample matrix. The third sample matrix may include high frequency grayscale information.

After the second sample matrix is input to the third generator, the third sample matrix may be generated by the third generator.

A depth of the third sample matrix may be one half of the second sample matrix, and a length and a width of the third sample matrix may be twice that of the second sample matrix. For example, the second sample matrix is a 64×64×64 matrix and the third sample matrix is a 32×128×128 matrix.

The third generator may include multiple residual blocks and an upsampling block. In one embodiment, the third generator may include three residual blocks.

Figure 5:
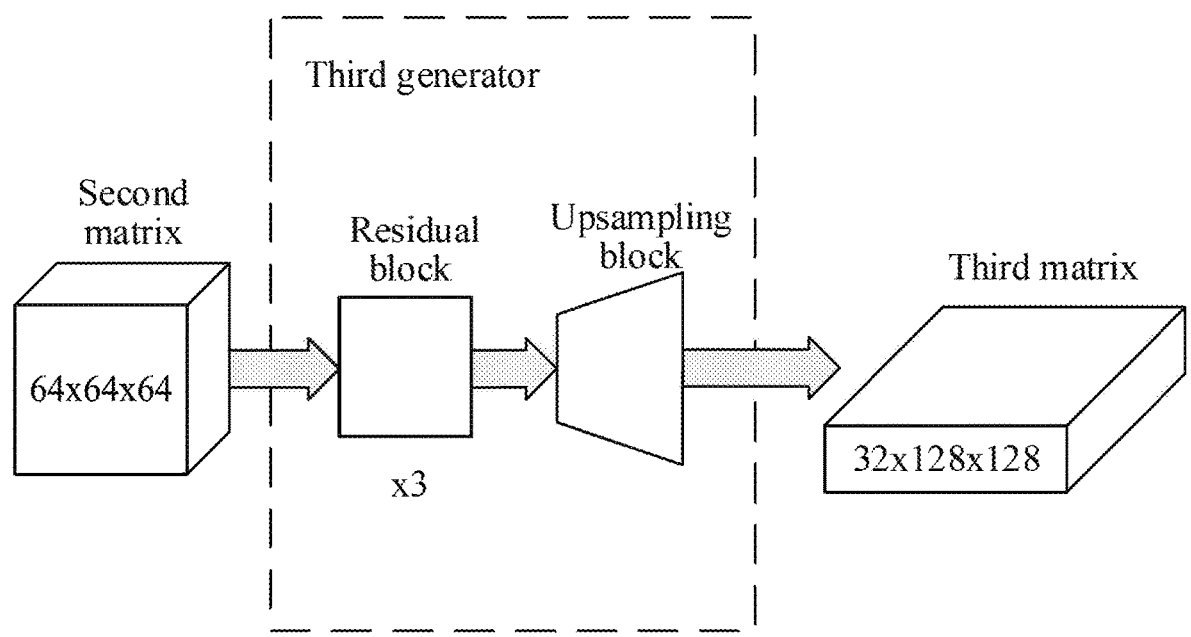
FIG. 5 shows a third generator in the method of FIG. 1.

A process of generating the third sample matrix according to the second sample matrix using the third generator is illustrated in FIG. 5.

At block 108, the third converter may generate a second sample grayscale image according to the third sample matrix.

The second sample grayscale image may be a high-resolution grayscale image, such as a 3×128×128 grayscale image.

The third converter may include a convolution layer and an activation function. In one embodiment, the third converter has a same structure as the first converter and the second converter. In one embodiment, a convolutional kernel of the third converter may be of 3×3×3 size with padding of one and a stride of one. The activation function of the third converter may be a tanh function. The convolution layer of the third converter may reduce a depth of the third sample matrix, while keeping a length and a width of the third sample matrix unchanged. The activation function of the third converter may obtain the second sample grayscale image. For example, the convolutional layer of the third converter may convert a 32×128×128 third sample matrix to a 3×128×128 matrix. The tanh function of the third converter may convert the 3×128×128 matrix to a 3×128×128 second sample grayscale image.

A process of generating the second sample grayscale image according to the third sample matrix using the third converter is illustrated in FIG. 7.

At block 109, the third discriminator may obtain a third target discriminant value according to the second sample grayscale image, and obtain a third reference discriminant value according to the training image. A third loss value may be calculated according to the third target discriminant value and the third reference discriminant value, and the third generator and the third converter may be optimized according to the third loss value.

Figure 9:
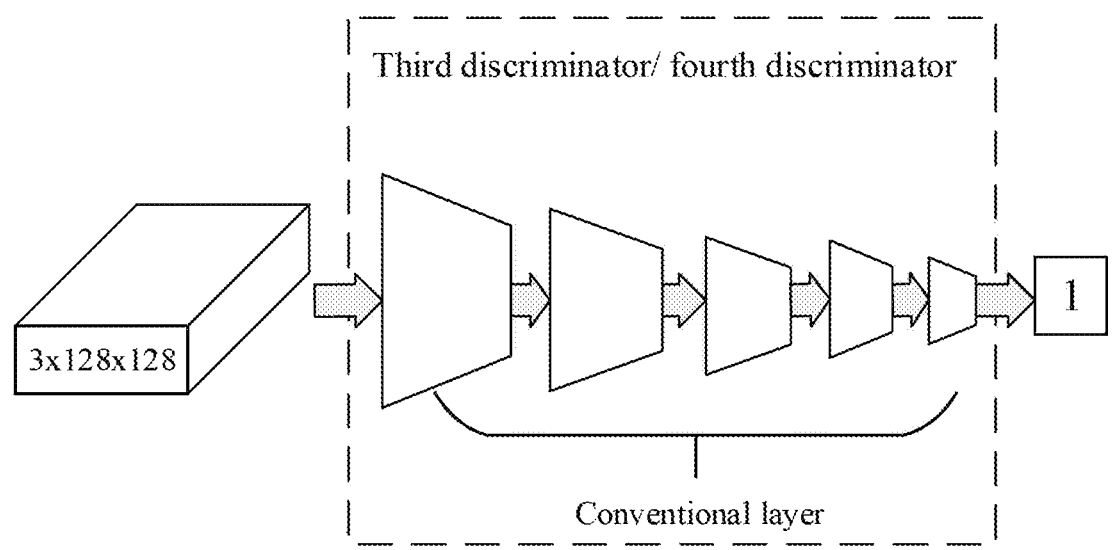
FIG. 9 shows a third discriminator and a fourth discriminator in the method of FIG. 1.

The third discriminator may include multiple convolution layers. In one embodiment, the third discriminator may include five convolution layers. A structure of the third discriminator is shown in FIG. 9.

Alternatively, the third discriminator may include multiple convolution layers and a fully connected layer. For example, the third discriminator may include four convolution layers and a fully connected layer.

After the second sample grayscale image is input to the third discriminator, the third discriminator may gradually reduce a size of the second sample grayscale image to obtain the third target discriminant value.

After a second reference grayscale image corresponding to the training image is input to the third discriminator, the third discriminator may gradually reduce a size of the second reference grayscale image to obtain the third reference discriminant value.

The second reference grayscale image may be a grayscale image obtained from the training image and of a same size as the second sample grayscale image.

In one embodiment, the third loss value is a WGAN-GP loss.

A calculation method of the third loss value may refer to the first loss value.

The third generator and the third converter may be optimized using a back-propagation (BP) algorithm.

At block 110, the fourth generator may generate a fourth sample matrix according to the third sample matrix. The fourth sample matrix may include color information.

After the third sample matrix is input to the fourth generator, the fourth sample matrix may be generated by the fourth generator.

The fourth sample matrix may be of a same size as the third sample matrix. For example, the third sample matrix is a 32×128×128 matrix, and the fourth sample matrix is also a 32×128×128 matrix.

The fourth generator may include a convolutional layer, multiple residual blocks, and an upsampling block. In one embodiment, the fourth generator has a same structure as the second generator. The fourth generator may include three residual blocks.

Figure 6:
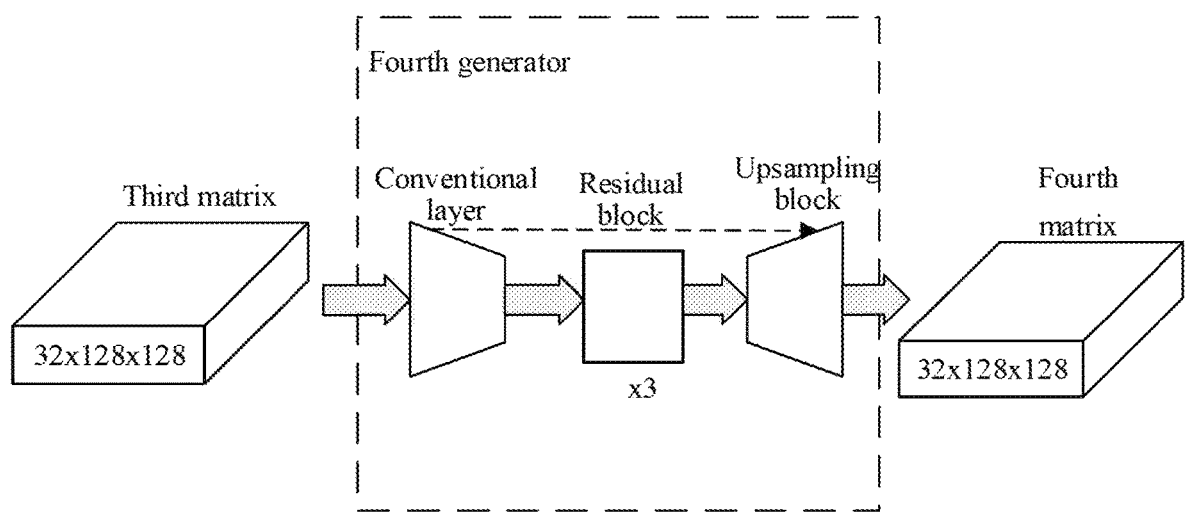
FIG. 6 shows a fourth generator in the method of FIG. 1.

A process of generating the fourth sample matrix according to the third sample matrix using the fourth generator is illustrated in FIG. 6.

At block 111, the fourth converter may generate a sample color image according to the fourth sample matrix.

A resolution of the sample color image may be same as the second sample grayscale image. For example, resolutions of the second sample grayscale image and the sample color image are 128×128.

The fourth converter may include a convolution layer and an activation function. A structure of the fourth converter may be same as the first converter, the second converter, and the third converter. In one embodiment, a convolutional kernel of the fourth converter may be of 3×3×3 size with padding of one and a stride of one. The activation function of the fourth converter may be a tanh function. The convolution layer of the fourth converter may reduce a depth of the fourth sample matrix, while keeping a length and a width of the fourth sample matrix unchanged. The activation function of the fourth converter may obtain the sample color image. For example, the convolutional layer of the fourth converter may convert a 32×128×128 fourth sample matrix to a 3×128×128 matrix. The tanh function of the fourth converter may convert the 3×128×128 matrix to a 3×128×128 sample color image.

A process of generating the sample color image according to the fourth sample matrix using the fourth converter is illustrated in FIG. 7.

At block 112, the fourth discriminator may obtain a fourth target discriminant value according to the sample color image, and obtain a fourth reference discriminant value according to the training image. A fourth loss value may be calculated according to the fourth target discriminant value and the fourth reference discriminant value, and the fourth generator and the fourth converter may be optimized according to the fourth loss value.

In one embodiment, a structure of the fourth discriminator may be same as the third discriminator.

The fourth discriminator may include multiple convolution layers. In one embodiment, the fourth discriminator may include five convolution layers. A structure of the fourth discriminator is shown in FIG. 9.

Alternatively, the fourth discriminator may include multiple convolution layers and a fully connected layer. For example, the fourth discriminator may include four convolution layers and a fully connected layer.

After the sample color image is input to the fourth discriminator, the fourth discriminator may gradually reduce a size of the sample color image to obtain the fourth target discriminant value.

After a reference color image corresponding to the training image is input to the fourth discriminator, the fourth discriminator may gradually reduce a size of the reference color image to obtain the fourth reference discriminant value.

The reference color image may be a color image obtained from the training image and of a same size as the sample color image.

In one embodiment, the fourth loss value is a WGAN-GP loss.

A calculation method of the fourth loss value may refer to the first loss value.

The fourth generator and the fourth converter may be optimized using a back-propagation (BP) algorithm.

Currently, a GAN model is difficult to train. Sometime a loss value of a discriminator of the GAN model is not a good guide for a training process. By calculating a WGAN-GP loss, the discriminator (the first discriminator/the second discriminator/the third discriminator/the fourth discriminator) no longer distinguishes whether an input image is a generated image or a training image, but calculates a gap between the training image and the generated image, even if the two are very different. The training process can be learned from the discriminator, thereby improving a stability of training of the image generation model.

Through the blocks 101-112 described above, a training of the image generation model is completed.

The present disclosure guides an image generation process by adding image features. A task of generating an image is divided into a plurality of subtasks. The image generation model is trained to complete each subtask. As such, a high-resolution image is finally generated.

For example, for a task that generates a 128×128 color image, the present disclosure may divide the task into four subtasks. The first subtask is to generate a 64×64 contour image. The second subtask is to generate a 64×64 grayscale image according to the 64×64 contour image. The third subtask is to convert the 64×64 grayscale image into a 128×128 grayscale image, which adds details to the 64×64 grayscale image. The last subtask is to add color information to the 128×128 grayscale image, so as to turn the 128×128 grayscale image into the 128×128 color image.

The present disclosure can specify subtasks of the image generation model to control an image generation process. Therefore, malfunctioning subtasks that cause poor image quality are easily discovered and modified. As such, the image generation model is trained more easily and a quality of images generated by the image generation model can be improved.

It may be understood that the image generation model may include more generators, converters, and discriminators depending on a size of an image that needs to be generated. For example, if a 256×256 color image needs to be generated, a fifth generator, a fifth converter, and a fifth discriminator can be added after the third generator to change the second sample grayscale image of 128×128 to a third grayscale image of 256×256. The 256×256 third grayscale image is then converted to a 256×256 color image.

FIG. 3 shows a first generator in the method of FIG. 1.

Input data of the first generator is noise, such as a sample noise or a target noise. The first generator may generate a first matrix according to the noise. The sample noise is used to train the image generation model. The target noise is used to generate a desired image. If a sample noise is input into the first generator, the first generator may generate a first sample matrix according to the sample noise. If a target noise is input into the first generator, the first generator may generate a first target matrix according to the target noise.

In FIG. 3, the first generator includes a fully connected layer and four upsampling blocks and the sample noise is a 1×100 matrix. The method of generating the first sample matrix according to the sample noise includes converting the 1×100 matrix to a 1×16384 matrix using the fully connected layer of the first generator, reconstructing the 1×16384 matrix to a 1024×4×4 matrix, and converting the 1024×4×4 matrix to a 64×64×64 first sample matrix using the four upsampling blocks of the first generator. Dimensions of the fully connected layer may be 100×16384. Each of the four upsampling blocks includes an upsampling layer and a convolutional layer. The upsampling layer performs an upsampling operation. For example, the upsampling layer performs the upsampling operation on the 1024×4×4 matrix to obtain a 1024×8×8 matrix. The convolutional layer performs a convolution operation. For example, the convolutional layer performs the convolution operation on the 1024×8×8 matrix to obtain a 512×8×8 matrix. After passing through the each of the four upsampling blocks, a depth of a matrix is reduced by half, and a length and a width of the matrix are doubled. After passing through the four upsampling blocks, the 1024×4×4 matrix becomes the 64×64×64 first sample matrix.

In one embodiment, the upsampling layer may stretch a matrix using a nearest-neighbor interpolation method. For example, the upsampling layer may use the nearest-neighbor interpolation method to stretch a 1024×4×4 matrix into a 1024×8×8 matrix.

In one embodiment, a convolutional kernel of the convolutional layer of the first generator may be of 3×3×512 size with padding of one and a stride of one.

FIG. 4 shows a second generator in the method of FIG. 1.

Input data of the second generator may be a first matrix, such as a first sample matrix or a first target matrix. The second generator may generate a second matrix according to the first matrix. If a first sample matrix is input into the second generator, the second generator may generate a second sample matrix according to the first sample matrix. If a first target matrix is input into the second generator, the second generator may generate a second target matrix according to the first target matrix.

In FIG. 4, the second generator includes a convolutional layer, three residual blocks (denoted as a first residual block set), and an upsampling block. Input data of the second generator is the first sample matrix, such as a 64×64×64 first sample matrix. The method of generating the second sample matrix according to the first sample matrix includes performing a convolution operation on the 64×64×64 first sample matrix using the convolutional layer of the second generator to obtain a first 64×32×32 matrix, converting the first 64×32×32 matrix to a second 64×32×32 matrix using the first residual block set, stacking the first 64×32×32 matrix and the second 64×32×32 matrix in depth (shown as dashed arrow in FIG. 4) to obtain a 128×32×32 matrix, and converting the 128×32×32 matrix to a 64×64×64 second sample matrix using the upsampling block of the second generator. A convolutional kernel of the second generator is of 3×3×64 size with padding of one and a stride of two.

The upsampling block in the second generator has a same structure as the upsampling block in the first generator.

FIG. 5 shows a third generator in the method of FIG. 1.

Input data of the third generator may be a second matrix, such as a second sample matrix or a second target matrix. The third generator may generate a third matrix according to the second matrix. If a second sample matrix is input into the third generator, the third generator may generate a third sample matrix according to the second sample matrix. If a second target matrix is input into the third generator, the third generator may generate a third target matrix according to the second target matrix.

In FIG. 5, the third generator includes three residual blocks (denoted as a second residual block set) and an upsampling block. Input data of the third generator is the second sample matrix, such as a 64×64×64 second sample matrix. The method of generating the third sample matrix according to the second sample matrix may include converting the 64×64×64 second sample matrix to a first 64×64×64 matrix using the second residual block set, and converting the first 64×64×64 matrix to a 32×128×128 third sample matrix using the upsampling block of the third generator.

The upsampling block in the third generator has a same structure as the upsampling blocks in the first generator.

FIG. 6 shows a fourth generator in the method of FIG. 1.

Input data of the fourth generator may be a third matrix, such as a third sample matrix or a third target matrix. The fourth generator may generate a fourth matrix according to the third matrix. If a third sample matrix is input into the fourth generator, the fourth generator may generate a fourth sample matrix according to the third sample matrix. If a third target matrix is input into the fourth generator, the fourth generator may generate a fourth target matrix according to the third target matrix.

In FIG. 6, the fourth generator includes a convolutional layer, three residual blocks (denoted as a third residual block set), and an upsampling block. Input data of the fourth generator is the third sample matrix, such as a 32×128×128 third sample matrix. The method of generating the fourth sample matrix according to the third sample matrix may include performing a convolution operation on the 32×128×128 third sample matrix using the convolutional layer of the fourth generator to obtain a first 32×64×64 matrix, converting the first 32×64×64 matrix to a second 32×64×64 matrix using the third residual block set, stacking the first 32×64×64 matrix and the second 32×64×64 matrix in depth (shown as dashed arrow in FIG. 6) to obtain a second 64×64×64 matrix, and converting the second 64×64×64 matrix to a 32×128×128 fourth sample matrix using the upsampling block of the fourth generator. A convolutional kernel of the fourth generator is of 3×3×32 size with padding of one and a stride of two.

The upsampling block in the fourth generator has a same structure as the upsampling block in the first generator.

FIG. 7 shows a first converter, a second converter, a third converter and a fourth converter in the method of FIG. 1.

In one embodiment, all the converters (the first converter, the second converter, the third converter, and the fourth converter) used in the present disclosure have a same structure. Each of the converters includes a convolution layer and an activation function. There is no matrix operation in the converters.

In one embodiment, a convolutional kernel of the each of the converters is of 3×3×3 size with padding of one and a stride of one. The activation function is a tanh function. Input data of the converters is a C×W×W matrix, where C is a depth, W is a length. The C×W×W matrix passes through the convolutional layer to obtain a 3×W×W matrix. The 3×W×W matrix passes through the tanh function to obtain a 3×W×W image.

FIG. 8 shows a first discriminator and a second discriminator in the method of FIG. 1.

As shown in FIG. 8, the first discriminator and the second discriminator each include four convolution layers. The convolution layers gradually reduce a size of an input image, and finally output a real number.

FIG. 9 shows a third discriminator and a fourth discriminator in the method of FIG. 1.

As shown in FIG. 9, the third discriminator and the fourth discriminator each include five convolution layers. The convolution layers gradually reduce a size of an input image, and finally output a real number.

Figure 10:
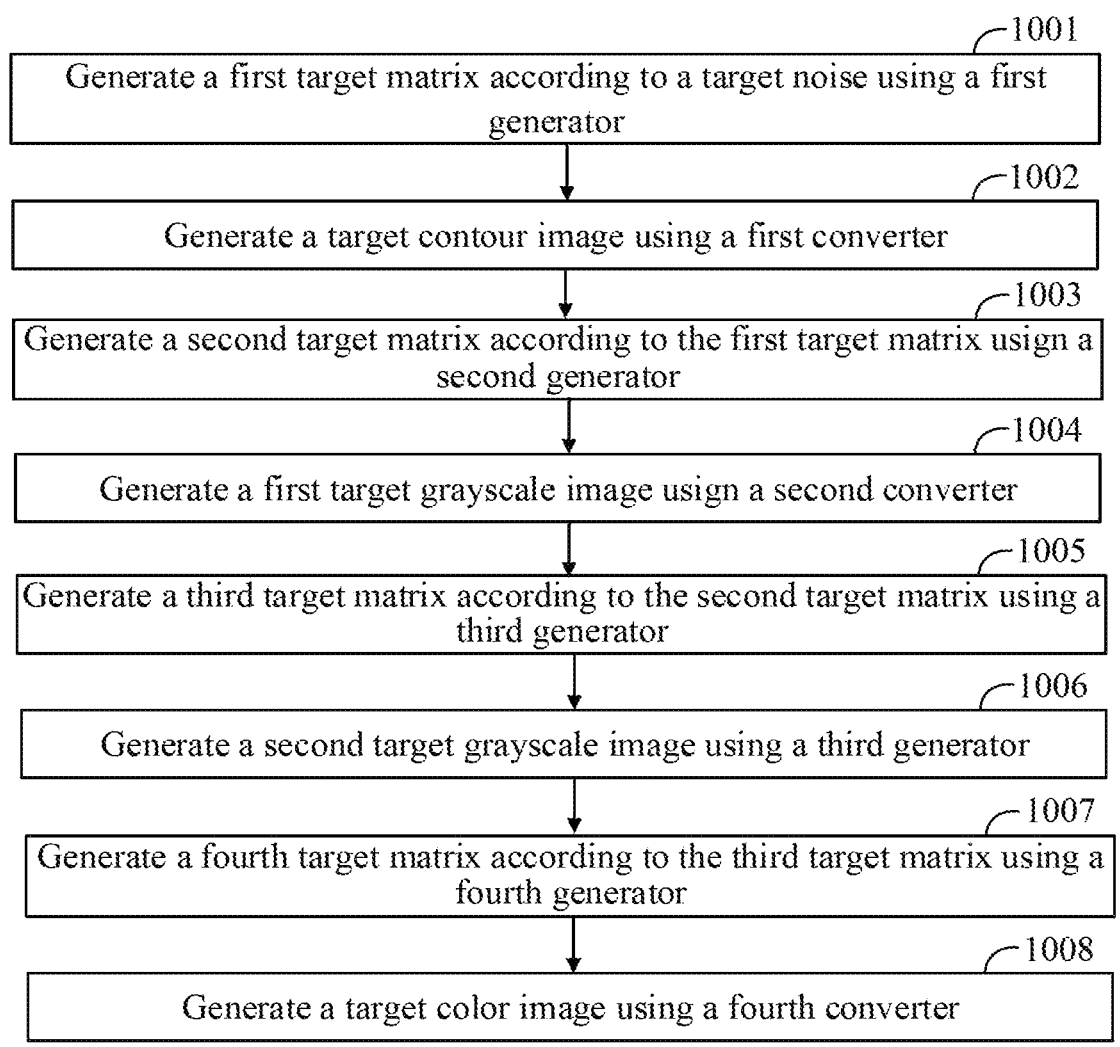
FIG. 10 is a flowchart of an embodiment of an image generation method.
Figure 11:
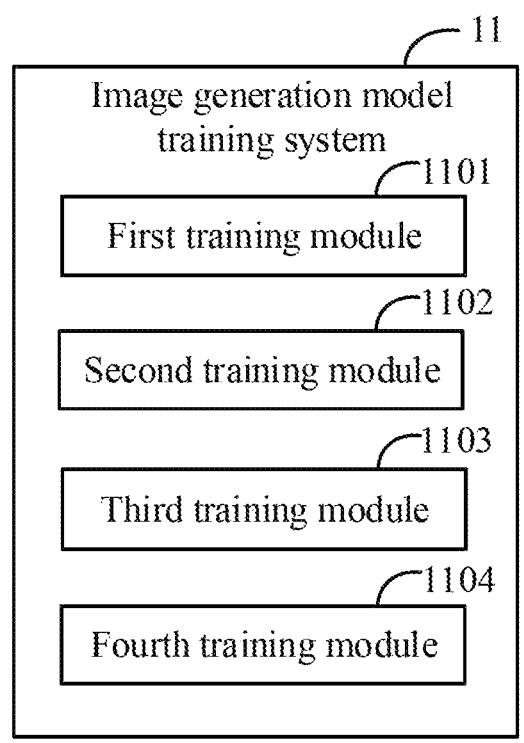
FIG. 11 is a block diagram of an embodiment of function modules of a system for training an image generation model.

FIG. 10 is a flowchart of one example embodiment of an image generation method. The image generation method uses the image generation model described in FIG. 1 and FIG. 2 to generate images after the image generation model is trained.

At block 1001, the first generator generates a first target matrix according to a target noise input to the image generation model.

A process of generating the first target matrix according to the target noise using the first generator is illustrated in FIG. 3.

At block 1002, the first converter generates a target contour image according to the first target matrix.

A process of generating the target contour image according to the first target matrix using the first converter is illustrated in FIG. 7.

At block 1003, the second generator generates a second target matrix according to the first target matrix.

A process of generating the second target matrix according to the first target matrix using the second generator is illustrated in FIG. 4.

At block 1004, the second converter generates a first target grayscale image according to the second target matrix.

A process of generating the first target grayscale image according to the second target matrix using the second converter is illustrated in FIG. 7.

At block 1005, the third generator generates a third target matrix according to the second target matrix.

A process of generating the third target matrix according to the second target matrix using the third generator is illustrated in FIG. 5.

At block 1006, the third converter generates a second target grayscale image according to the third target matrix.

A process of generating the second target grayscale image according to the third target matrix using the third converter is illustrated in FIG. 7.

At block 1007, the fourth generator generates a fourth target matrix according to the third target matrix.

A process of generating the fourth target matrix according to the third target matrix using the fourth generator is illustrated in FIG. 6.

At block 1008, the fourth converter generates a target color image according to the fourth target matrix.

A process of generating the target color image according to the fourth target matrix using the fourth converter is illustrated in FIG. 7.

According to the image generation method, an image with a same type as the training image can be generated. For example, the training image is a face image, and a new image generated is also a face image.

The target color image generated by the image generation model is a high-quality image. Details in the target color image are fine and delicate. A layout of the target color image is reasonable and satisfactory.

Comparing face images generated by the present disclosure with face images generated by StackGAN, it is found that some face images generated by the StackGAN model are unnaturally distorted when generating 64×64 color images, indicating that learning of GAN structure is restricted. Distortion also appears in 128×128 color images and 256×256 color images for StackGAN. 64×64 grayscale images generated by the present disclosure have less unnatural distortion, and corresponding distortion of 128×128 grayscale images and 128×128 color images is also less.

FIG. 1 is a block diagram of one example embodiment of function modules of a system for training an image generation model. A system 11 is used to train an image generation model and includes four generators (denoted as a first generator, a second generator, a third generator, and a fourth generator), four converters (denoted as a first converter, a second converter, a third converter, and a fourth converter) and four discriminators (denoted as a first discriminator, a second discriminator, a third discriminator, and a fourth discriminator).

The system 11 runs in a computer device. The system 11 can include a plurality of modules. The plurality of modules can comprise computerized instructions in a form of one or more computer-readable programs that can be stored in a non-transitory computer-readable medium (e.g., a storage device of the computer device), and executed by at least one processor of the computer device.

In at least one embodiment, the system 11 may include a plurality of modules. The plurality of modules may include, but is not limited to, a first training module 1101, a second training module 1102, a third training module 1103, and a fourth training module 1104. The modules 1101-1104 can comprise computerized instructions in the form of one or more computer-readable programs that can be stored in the non-transitory computer-readable medium (e.g., the storage device of the computer device), and executed by the at least one processor of the computer device.

The first training module 1101 may generate a first sample matrix according to a sample noise using the first generator. The first sample matrix may include contour information.

After the sample noise is input to the first generator, the first sample matrix may be generated by the first generator.

The sample noise may be a row matrix. Elements in the row matrix may be random numbers between 0 and 1 which obey a Gaussian distribution. In one embodiment, the sample noise may be a 1×100 matrix.

The first sample matrix may be a small size matrix, such as a 64×64×64 matrix.

The first generator may include a fully connected layer and multiple upsampling blocks. In one embodiment, the first generator may include four upsampling blocks.

A process of generating the first sample matrix according to the sample noise using the first generator is illustrated in FIG. 3.

The first training module 1101 may further generate a sample contour image according to the first sample matrix using the first converter.

The sample contour image may be a low-resolution image, such as a 3×64×64 image.

The first converter may include a convolution layer and an activation function. In one embodiment, a convolutional kernel of the first converter may be of 3×3×3 size with padding of one and a stride of one. The activation function of the first converter may be a tanh function. The convolution layer of the first converter may reduce a depth of the first sample matrix, while keeping a length and a width of the first sample matrix unchanged. The activation function of the first converter may obtain the sample contour image. For example, the convolutional layer of the first converter may convert a 64×64×64 first sample matrix to a 3×64×64 matrix. The tanh function of the first converter may convert the 3×64×64 matrix to a 3×64×64 sample contour image.

A process of generating the sample contour image according to the first sample matrix using the first converter is illustrated in FIG. 7.

The first training module 1101 may further use the first discriminator to obtain a first target discriminant value according to the sample contour image and a first reference discriminant value according to a training image, calculate a first loss value according to the first target discriminant value and the first reference discriminant value, and optimize the first generator and the first converter according to the first loss value.

The first discriminator may include multiple convolution layers. In one embodiment, the first discriminator may include four convolution layers. A structure of the first discriminator is shown in FIG. 8.

Alternatively, the first discriminator may include multiple convolution layers and a fully connected layer. For example, the first discriminator may include three convolution layers and a fully connected layer.

After the sample contour image is input to the first discriminator, the first discriminator may gradually reduce a size of the sample contour image to obtain the first target discriminant value.

After a reference contour image derived from the training image is input to the first discriminator, the first discriminator may gradually reduce a size of the reference contour image to obtain the first reference discriminant value.

The reference contour image may be a contour image obtained from the training image and of a same size as the sample contour image.

Training images are selected according to an application scenario of the image generation model. For example, if the image generation model is used to generate face images, the training images may be face images. If the image generation model is used to generate natural landscape images, the training images may be natural landscape images.

In one embodiment, the first loss value may be a WGAN-GP (Wasserstein GAN with gradient penalty) loss.

Optionally, the first loss value may be calculated as follows:

$$D_{loss} = E_z(D(G(z))) - E_x(D(x)) + GP$$

$$GP = \lambda * E_{x \sim P(\tilde{x})}(\|\nabla_z D(x)\|_2 - 1)^2$$

$$\tilde{x} = \varepsilon G(z) + (1-\varepsilon) * X$$

In the above equations, "$\varepsilon$" represents a random number between 0 and 1. "$\lambda$" is an empirical value and is usually taken as 0.5. "E" denotes an expected value, "x" denotes a training image, "D( )" denotes a result of a discriminator (such as the first discriminator), and "G( )" denotes an image (such as the sample contour image) generated by a converter (such as the first converter) corresponding to the discriminator.

$E_{x \sim P(\tilde{x})}(\|\nabla_z D(x)\|_2 - 1)^2$ denotes that after "x" is input to the discriminator, a norm of each parameter is subtracted from 1 and all results are added so that a gradient of all parameters of the discriminator is close to 1, to stabilize the training.

The first generator and the first converter may be optimized using a back-propagation (BP) algorithm.

The second training module 1102 may generate a second sample matrix according to the first sample matrix using the second generator. The second sample matrix may include low frequency grayscale information.

After the first sample matrix is input to the second generator, the second sample matrix may be generated by the second generator.

The second sample matrix may be of a same size as the first sample matrix. For example, the first sample matrix is a 64×64×64 matrix, and the second sample matrix is also a 64×64×64 matrix.

The second generator may include a convolutional layer, multiple residual blocks, and an upsampling block. In one embodiment, the second generator may include three residual blocks.

A residual block is a basic module in a residual network. A residual block may include two convolutional layers. In one embodiment, a convolutional kernel of the convolutional layer of the residual block may be of 3×3×C size with padding of one and a stride of one, where C is a depth of an input matrix.

A process of generating the second sample matrix according to the first sample matrix using the second generator is illustrated in FIG. 4.

The second training module 1102 may further generate a first sample grayscale image according to the second sample matrix using the second converter.

The first sample grayscale image may be a low-resolution grayscale image, such as a 3×64×64 grayscale image.

A resolution of the first sample grayscale image may be same as the sample contour image. For example, resolutions of the first sample grayscale image and the sample contour image are 64×64.

The second converter may include a convolution layer and an activation function. A structure of the second converter may be same as the first converter. In one embodiment, a convolutional kernel of the second converter may be of 3×3×3 size with padding of one and a stride of one. The activation function of the second converter may be a tanh function. The convolution layer of the second converter may reduce a depth of the second sample matrix, while keeping a length and a width of the second sample matrix unchanged. The activation function of the second converter may obtain the first sample grayscale image. For example, the convolutional layer of the second converter may convert a 64×64×64 second sample matrix to a 3×64×64 matrix. The tanh function of the second converter may convert the 3×64×64 matrix to a 3×64×64 first sample grayscale image.

A process of generating the first sample grayscale image according to the second sample matrix using the second converter is illustrated in FIG. 7.

The second training module 1102 may further use the second discriminator to obtain a second target discriminant value according to the first sample grayscale image and a second reference discriminant value according to the training image, calculate a second loss value according to the second target discriminant value and the second reference discriminant value, and optimize the second generator and the second converter according to the second loss value.

In one embodiment, a structure of the second discriminator may be same as the first discriminator.

The second discriminator may include multiple convolution layers. In one embodiment, the second discriminator may include four convolution layers. A structure of the second discriminator is shown in FIG. 8.

Alternatively, the second discriminator may include multiple convolution layers and a fully connected layer. For example, the second discriminator may include three convolution layers and a fully connected layer.

After the first sample grayscale image is input to the second discriminator, the second discriminator may gradually reduce a size of the first sample grayscale image to obtain the second target discriminant value.

After a first reference grayscale image corresponding to the training image is input to the second discriminator, the second discriminator may gradually reduce a size of the first reference grayscale image to obtain the second reference discriminant value.

The first reference grayscale image may be a grayscale image obtained from the training image and of a same size as the first sample grayscale image.

In one embodiment, the second loss value is a WGAN-GP loss.

A calculation method of the second loss value may refer to the first loss value.

The second generator and the second converter may be optimized using a back-propagation (BP) algorithm.

The third training module 1103 may generate a third sample matrix according to the second sample matrix using the third generator. The third sample matrix may include high frequency grayscale information.

After the second sample matrix is input to the third generator, the third sample matrix may be generated by the third generator.

A depth of the third sample matrix may be one half of the second sample matrix, and a length and a width of the third sample matrix may be twice that of the second sample matrix. For example, the second sample matrix is a 64×64×64 matrix and the third sample matrix is a 32×128×128 matrix.

The third generator may include multiple residual blocks and an upsampling block. In one embodiment, the third generator may include three residual blocks.

A process of generating the third sample matrix according to the second sample matrix using the third generator is illustrated in FIG. 5.

The third training module 1103 may further generate a second sample grayscale image according to the third sample matrix using the third converter.

The second sample grayscale image may be a high-resolution grayscale image, such as a 3×128×128 grayscale image.

The third converter may include a convolution layer and an activation function. In one embodiment, the third converter has a same structure as the first converter and the second converter. In one embodiment, a convolutional kernel of the third converter may be of 3×3×3 size with padding of one and a stride of one. The activation function of the third converter may be a tanh function. The convolution layer of the third converter may reduce a depth of the third sample matrix, while keeping a length and a width of the third sample matrix unchanged. The activation function of the third converter may obtain the second sample grayscale image. For example, the convolutional layer of the third converter may convert a 32×128×128 third sample matrix to a 3×128×128 matrix. The tanh function of the third converter may convert the 3×128×128 matrix to a 3×128×128 second sample grayscale image.

A process of generating the second sample grayscale image according to the third sample matrix using the third converter is illustrated in FIG. 7.

The third training module 1103 may further use the third discriminator to obtain a third target discriminant value according to the second sample grayscale image and a third reference discriminant value according to the training image, calculate a third loss value according to the third target discriminant value and the third reference discriminant value, and optimize the third generator and the third converter according to the third loss value.

The third discriminator may include multiple convolution layers. In one embodiment, the third discriminator may include five convolution layers. A structure of the third discriminator is shown in FIG. 9.

Alternatively, the third discriminator may include multiple convolution layers and a fully connected layer. For example, the third discriminator may include four convolution layers and a fully connected layer.

After the second sample grayscale image is input to the third discriminator, the third discriminator may gradually reduce a size of the second sample grayscale image to obtain the third target discriminant value.

After a second reference grayscale image corresponding to the training image is input to the third discriminator, the third discriminator may gradually reduce a size of the second reference grayscale image to obtain the third reference discriminant value.

The second reference grayscale image may be a grayscale image obtained from the training image and of a same size as the second sample grayscale image.

In one embodiment, the third loss value is a WGAN-GP loss.

A calculation method of the third loss value may refer to the first loss value.

The third generator and the third converter may be optimized using a back-propagation (BP) algorithm.

The fourth training module 1104 may generate a fourth sample matrix according to the third sample matrix using the fourth generator. The fourth sample matrix may include color information.

After the third sample matrix is input to the fourth generator, the fourth sample matrix may be generated by the fourth generator.

The fourth sample matrix may be of a same size as the third sample matrix. For example, the third sample matrix is a 32×128×128 matrix, and the fourth sample matrix is also a 32×128×128 matrix.

The fourth generator may include a convolutional layer, multiple residual blocks, and an upsampling block. In one embodiment, the fourth generator has a same structure as the second generator. The fourth generator may include three residual blocks.

A process of generating the fourth sample matrix according to the third sample matrix using the fourth generator is illustrated in FIG. 6.

The fourth training module 1104 may further generate a sample color image according to the fourth sample matrix using the fourth converter.

A resolution of the sample color image may be same as the second sample grayscale image. For example, resolutions of the second sample grayscale image and the sample color image are 128×128.

The fourth converter may include a convolution layer and an activation function. A structure of the fourth converter may be same as the first converter, the second converter, and the third converter. In one embodiment, a convolutional kernel of the fourth converter may be of 3×3×3 size with padding of one and a stride of one. The activation function of the fourth converter may be a tanh function. The convolution layer of the fourth converter may reduce a depth of the fourth sample matrix, while keeping a length and a width of the fourth sample matrix unchanged. The activation function of the fourth converter may obtain the sample color image. For example, the convolutional layer of the fourth converter may convert a 32×128×128 fourth sample matrix to a 3×128×128 matrix. The tanh function of the fourth converter may convert the 3×28×28 matrix to a 3×128×128 sample color image.

A process of generating the sample color image according to the fourth sample matrix using the fourth converter is illustrated in FIG. 7.

The fourth training module 1104 may further use the fourth discriminator to obtain a fourth target discriminant value according to the sample color image and a fourth reference discriminant value according to the training image, calculate a fourth loss value according to the fourth target discriminant value and the fourth reference discriminant value, and optimize the fourth generator and the fourth converter according to the fourth loss value.

In one embodiment, a structure of the fourth discriminator may be same as the third discriminator.

The fourth discriminator may include multiple convolution layers. In one embodiment, the fourth discriminator may include five convolution layers. A structure of the fourth discriminator is shown in FIG. 9.

Alternatively, the fourth discriminator may include multiple convolution layers and a fully connected layer. For example, the fourth discriminator may include four convolution layers and a fully connected layer.

After the sample color image is input to the fourth discriminator, the fourth discriminator may gradually reduce a size of the sample color image to obtain the fourth target discriminant value.

After a reference color image corresponding to the training image is input to the fourth discriminator, the fourth discriminator may gradually reduce a size of the reference color image to obtain the fourth reference discriminant value.

The reference color image may be a color image obtained from the training image and of a same size as the sample color image.

In one embodiment, the fourth loss value is a WGAN-GP loss.

A calculation method of the fourth loss value may refer to the first loss value.

The fourth generator and the fourth converter may be optimized using a back-propagation (BP) algorithm.

Currently, a GAN model is difficult to train. Sometime a loss value of a discriminator of the GAN model is not a good guide for a training process. By calculating a WGAN-GP loss, the discriminator (the first discriminator/the second discriminator/the third discriminator/the fourth discriminator) no longer distinguishes whether an input image is a generated image or a training image, but calculates a gap between the training image and the generated image, even if the two are very different. The training process can be learned from the discriminator, thereby improving a stability of training of the image generation model.

The present disclosure guides an image generation process by adding image features. A task of generating an image is divided into a plurality of subtasks. The image generation model is trained to complete each subtask. As such, a high-resolution image is generated.

For example, for a task that generates a 128×128 color image, the present disclosure may divide the task into four subtasks. The first subtask is to generate a 64×64 contour image. The second subtask is to generate a 64×64 grayscale image according to the 64×64 contour image. The third subtask is to convert the 64×64 grayscale image into a 128×28 grayscale image, which adds details to the 64×64 grayscale image. The last subtask is to add color information to the 128×128 grayscale image, so as to turn the 128×128 grayscale image into the 128×128 color image.

The system 11 can specify subtasks of the image generation model to control an image generation process. Therefore, malfunctioning subtasks that cause poor image quality are easily discovered and modified. As such, the image generation model is trained more easily and a quality of images generated by the image generation model can be improved.

Figure 12:
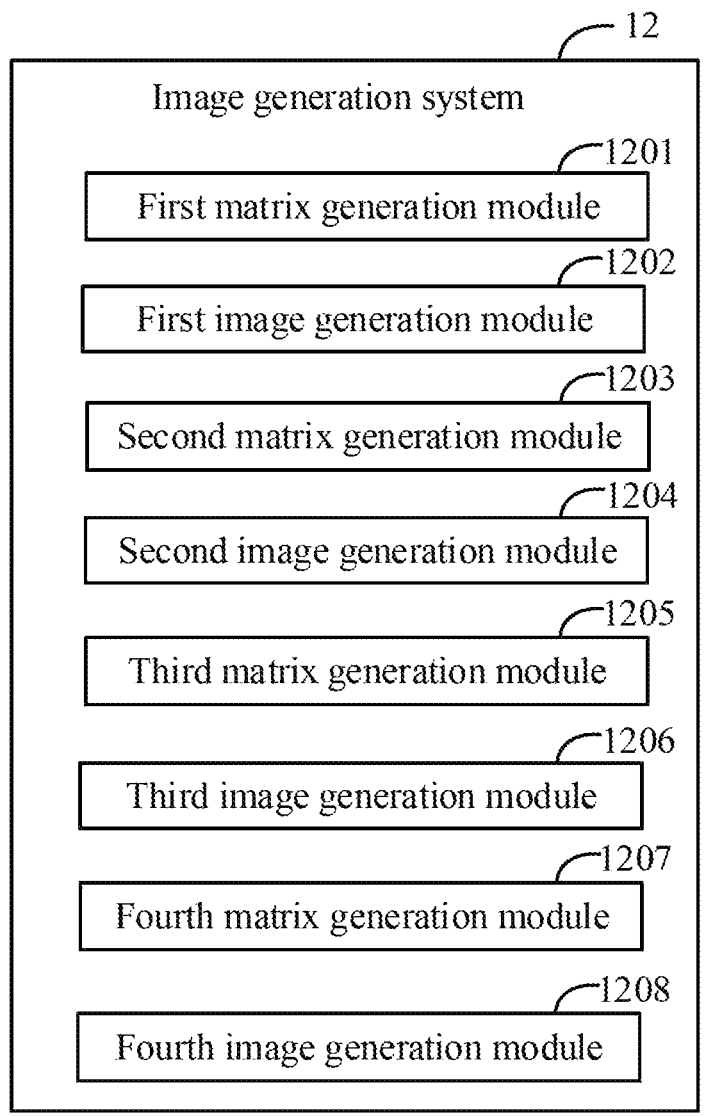
FIG. 12 is a block diagram of an embodiment of function modules of an image generation system.

FIG. 12 is a block diagram of one example embodiment of function modules of an image generation system 12. The image generation system 12 may generate images using an image generation model includes four generators (denoted as a first generator, a second generator, a third generator, and a fourth generator), four converters (denoted as a first converter, a second converter, a third converter, and a fourth converter) and four discriminators (denoted as a first discriminator, a second discriminator, a third discriminator, and a fourth discriminator) after the image generation model is trained.

The image generation system 12 runs in a computer device. The image generation system 12 can include a plurality of modules. The plurality of modules can comprise computerized instructions in a form of one or more computer-readable programs that can be stored in a non-transitory computer-readable medium (e.g., a storage device of the computer device), and executed by at least one processor of the computer device.

In at least one embodiment, the image generation system 12 may include a plurality of modules. The plurality of modules may include, but is not limited to, a first matrix generation module 1201, a first image generation module 1202, a second matrix generation module 1203, a second image generation module 1204, a third matrix generation module 1205, a third image generation module 1206, a fourth matrix generation module 1207, and a fourth image generation module 1208. The modules 1201-1208 can comprise computerized instructions in the form of one or more computer-readable programs that can be stored in the non-transitory computer-readable medium (e.g., the storage device of the computer device), and executed by the at least one processor of the computer device.

The first matrix generation module 1201 may generate a first target matrix according to a target noise input to the image generation model using the first generator.

A process of the first matrix generation module 1201 generating the first target matrix according to the target noise may refer to the first training module 1101 generating the first sample matrix according to the sample noise.

The first image generation module 1202 may generate a target contour image according to the first target matrix using the first converter.

A process of the first image generation module 1202 generating the target contour image according to the first target matrix may refer to the first training module 1101 generating the sample contour image according to the first sample matrix.

The second matrix generation module 1203 may generate a second target matrix according to the first target matrix using the second generator.

A process of the second matrix generation module 1203 generating the second target matrix according to the first target matrix may refer to the second training module 1102 generating the second sample matrix according to the first sample matrix.

The second image generation module 1204 may generate a first target grayscale image according to the second target matrix using the second converter.

A process of the second image generation module 1204 generating the first target grayscale image according to the second target matrix may refer to the second training module 1102 generating the first sample grayscale image according to the second sample matrix.

The third matrix generation module 1205 may generate a third target matrix according to the second target matrix using the third generator.

A process of the third matrix generation module 1205 generating the third target matrix according to the second target matrix may refer to the third training module 1103 generating the third sample matrix according to the second sample matrix.

The third image generation module 1206 may generate a second target grayscale image according to the third target matrix using the third converter.

A process of the third image generation module 1206 generating the second target grayscale image according to the third target matrix may refer to the third training module 1103 generating the second sample grayscale image according to the third sample matrix.

The fourth matrix generation module 1207 may generate a fourth target matrix according to the third target matrix using the fourth generator.

A process of the fourth matrix generation module 1207 generating the fourth target matrix according to the third target matrix may refer to the fourth training module 1104 generating the fourth sample matrix according to the third sample matrix.

The fourth image generation module 1208 may generate a target color image according to the fourth target matrix using the fourth converter.

A process of the fourth image generation module 1208 generating the target color image according to the fourth target matrix may refer to the fourth training module 1104 generating the sample color image according to the fourth sample matrix.

The image generation system 12 may generate an image with a same type as the training image. For example, the training image is a face image, and a new image generated is also a face image.

The target color image generated by the image generation model is a high-quality image. Details in the target color image are fine and delicate. A layout of the target color image is reasonable and satisfactory.

Comparing face images generated by the present disclosure with face images generated by StackGAN, it is found that some face images generated by the StackGAN model are unnaturally distorted when generating 64×64 color images, indicating that learning of GAN structure is restricted. Distortion also appears in 128×128 color images and 256×256 color images for StackGAN. 64×64 grayscale images generated by the present disclosure have less unnatural distortion, and corresponding distortion of 128×128 grayscale images and 128×128 color images is also less.

Figure 13:
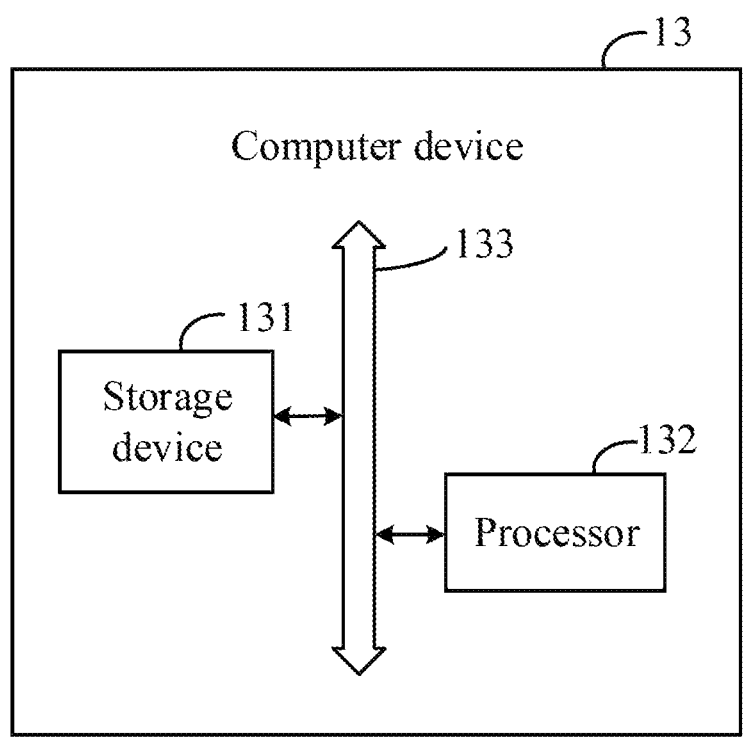
FIG. 13 is a block diagram of an embodiment of a computer device utilizing the method of FIG. 1.

FIG. 13 is a block diagram of one example embodiment of a computer device utilizing the method of FIG. 1. In one embodiment, a computer device 13 includes a storage device 131, at least one processor 132, and at least one bus 133. It should be understood by those skilled in the art that the structure of the computer device 13 shown in FIG. 13 does not constitute a limitation of the embodiment of the present disclosure. The computer device 13 may have a bus type structure or a star type structure, and the computer device 13 may further include other hardware or software, or the computer device 13 may have different component arrangements.

In at least one embodiment, the computer device 13 may include a terminal that is capable of automatically performing numerical calculations and/or information processing in accordance with pre-set or stored instructions. The hardware of terminal may include, but is not limited to, a microprocessor, an application specific integrated circuit (ASIC), programmable gate arrays, digital processors, and embedded devices.

It should be noted that the computer device 13 is merely an example, and other existing or future electronic examples are included in the scope of the present disclosure, and are included in the reference.

In some embodiments, the storage device 131 can be used to store program codes of computer readable programs and various data, such as the system 11 or the image generation system 12 installed in the computer device 13, and automatically access the programs or data with high speed during running of the computer device 13. The storage device 131 may include a read-only memory (ROM), a programmable read-only memory (PROM), an erasable programmable read only memory (EPROM), an one-time programmable read-only memory (OTPROM), an electronically-erasable programmable read-only memory (EEPROM)), a compact disc read-only memory (CD-ROM), or other optical disk storage, magnetic disk storage, magnetic tape storage, or any other storage medium readable by the computer device 13 that can be used to carry or store data.

In some embodiments, the at least one processor 132 may be composed of an integrated circuit, for example, may be composed of a single packaged integrated circuit, or may be composed of multiple integrated circuits of same function or different functions. The at least one processor 132 may include one or more central processing units (CPU), a microprocessor, a digital processing chip, a graphics processor, and various control chips. The at least one processor 132 is a control unit of the computer device 13 which connects various components of the computer device 13 using various interfaces and lines. By running or executing a computer program or modules stored in the storage device 131, and by invoking the data stored in the storage device 131, the at least one processor 132 can perform various functions of the computer device 13 and process data of the computer device 13. For example, the function of performing image generation model training or image generation itself.

In some embodiments, the at least one bus 133 is used to achieve communication between the storage device 131 and the at least one processor 132, and other components of the computer device 13.

Although not shown, the computer device 13 may further include a power supply (such as a battery) for powering various components. Preferably, the power supply may be logically connected to the at least one processor 132 through a power management device, thereby, the power management device manages functions such as charging, discharging, and power management. The power supply may include one or more a DC or AC power source, a recharging device, a power failure detection circuit, a power converter or inverter, a power status indicator, and the like. The computer device 13 may further include various sensors, such as a BLUETOOTH module, a WI-FI module, and the like, and details are not described herein.

In at least one embodiment, as shown in FIG. 13, the at least one processor 132 can execute various types of applications (such as the system 11 or 12) installed in the computer device 13, program codes, and the like. For example, the at least one processor 132 can execute the modules 1101-1104 of the system 11 or the modules 1201-1208 of the system 12.

In at least one embodiment, the storage device 131 stores program codes. The at least one processor 132 can invoke the program codes stored in the storage device 131 to perform functions. For example, the modules described in FIG. 13 are program codes stored in the storage device 131 and executed by the at least one processor 132, to implement the functions of the various modules for the purpose of image generation model training or image generation.

In at least one embodiment, the storage device 131 stores one or more instructions (i.e., at least one instruction) that are executed by the at least one processor 132 to achieve the purpose of image generation model training or image generation itself.

In at least one embodiment, the at least one processor 132 can execute the at least one instruction stored in the storage device 131 to perform the operations of as shown in FIG. 1.

The steps in the method of the embodiments of the present disclosure may be sequentially adjusted, merged, and deleted according to actual needs.

The above description is only embodiments of the present disclosure, and is not intended to limit the present disclosure, various modifications and changes can be made to the present disclosure. Any modifications, equivalent substitutions, improvements, etc. made within the spirit and scope of the present disclosure are intended to be included within the scope of the present disclosure.

What is claimed is:

1. A method for training an image generation model being executed by a computer device, the method comprising:
generating a first sample matrix according to a sample noise using a first generator of an image generation module;
generating a sample contour image according to the first sample matrix using a first converter of the image generation module;
obtaining a first target discriminant value according to the sample contour image and a first reference discriminant value according to a training image using a first discriminator of the image generation module, calculating a first loss value according to the first target discriminant value and the first reference discriminant value, and optimizing the first generator and the first converter according to the first loss value;
generating a second sample matrix according to the first sample matrix using a second generator of the image generation module;
generating a first sample grayscale image according to the second sample matrix using a second converter of the image generation module;
obtaining a second target discriminant value according to the first sample grayscale image and a second reference discriminant value according to the training image using a second discriminator of the image generation module, calculating a second loss value according to the second target discriminant value and the second reference discriminant value, and optimizing the second generator and the second converter according to the second loss value;
generating a third sample matrix according to the second sample matrix using a third generator of the image generation module;
generating a second sample grayscale image according to the third sample matrix using a third converter of the image generation module;
obtaining a third target discriminant value according to the second sample grayscale image and a third reference discriminant value according to the training image using a third discriminator of the image generation module, calculating a third loss value according to the third target discriminant value and the third reference discriminant value, and optimizing the third generator and the third converter according to the third loss value;
generating a fourth sample matrix according to the third sample matrix using a fourth generator of the image generation module;
generating a sample color image according to the fourth sample matrix using a fourth converter of the image generation module; and
obtaining a fourth target discriminant value according to the sample color image and a fourth reference discriminant value according to the training image using a fourth discriminator of the image generation module, calculating a fourth loss value according to the fourth target discriminant value and the fourth reference discriminant value, and optimizing the fourth generator and the fourth converter according to the fourth loss value.

2. The method according to claim 1, further comprising:
generating a first target matrix according to a target noise using the first generator;
generating a target contour image according to the first target matrix using the first converter;
generating a second target matrix according to the first target matrix using the second generator;
generating a first target grayscale image according to the second target matrix using the second converter;
generating a third target matrix according to the second target matrix using the third generator;
generating a second target grayscale image according to the third target matrix using the third converter;
generating a fourth target matrix according to the third target matrix using the fourth generator; and
generating a target color image according to the fourth target matrix using the fourth converter.

3. The method according to claim 1, wherein the first loss value is calculated as follows:

$$D_{loss} = E_z(D(G(z))) - E_x(D(x)) + GP,$$

$$GP = \lambda * E_{x \sim P(\tilde{x})}(\|\nabla_x D(x)\|_2 - 1)^2,$$

$$\tilde{x} = \varepsilon G(z) + (1-E)*X,$$

wherein ε represents a random number between 0 and 1, λ is an empirical value, E denotes an expected value, x denotes the training image, D( ) denotes a result of the first discriminator, and G( ) denotes the sample contour image.

4. The method according to claim 1, wherein the sample noise is a 1×100 matrix, the first generator comprises a fully connected layer and four upsampling blocks, and a method of generating the first sample matrix according to the sample noise comprises:
converting the 1×100 matrix to a 1×16384 matrix using the fully connected layer of the first generator;
reconstructing the 1×16384 matrix to a 1024×4×4 matrix; and
converting the 1024×4×4 matrix to a 64×64×64 first sample matrix using the four upsampling blocks of the first generator.

5. The method according to claim 4, wherein the second generator comprises a convolutional layer, a first residual block set, and an upsampling block, a method of generating the second sample matrix according to the first sample matrix comprises:
performing a convolution operation on the 64×64×64 first sample matrix to obtain a first 64×32×32 matrix using the convolutional layer of the second generator;
converting the first 64×32×32 matrix to a second 64×32×32 matrix using the first residual block set;

stacking the first 64×32×32 matrix and the second 64×32×32 matrix in depth to obtain a 128×32×32 matrix; and converting the 128×32×32 matrix to a 64×64×64 second sample matrix using the upsampling block of the second generator.

6. The method according to claim 5, wherein the third generator comprises a second residual block set and an upsampling block, and a method of generating the third sample matrix according to the second sample matrix comprises:

converting the 64×64×64 second sample matrix to a first 64×64×64 matrix using the second residual block set; and converting the first 64×64×64 matrix to a 32×128×128 third sample matrix using the upsampling block of the third generator.

7. The method according to claim 6, wherein the fourth generator comprises a convolutional layer, a third residual block set, and an upsampling block, and a method of generating the fourth sample matrix according to the third sample matrix comprises:

performing a convolution operation on the 32×128×128 third sample matrix to obtain a first 32×64×64 matrix using the convolutional layer of the fourth generator, converting the first 32×64×64 matrix to a second 32×64×64 matrix using the third residual block set;

stacking the first 32×64×64 matrix and the second 32×64×64 matrix in depth to obtain a second 64×64×64 matrix; and converting the second 64×64×64 matrix to a 32×128×128 fourth sample matrix using the upsampling block of the fourth generator.

8. A computer device comprising:

a storage device;

at least one processor, and the storage device storing one or more programs, which when executed by the at least one processor, cause the at least one processor to perform operations comprising:

generating a first sample matrix according to a sample noise using a first generator of an image generation module;

generating a sample contour image according to the first sample matrix using a first converter of the image generation module;

obtaining a first target discriminant value according to the sample contour image and a first reference discriminant value according to a training image using a first discriminator of the image generation module, calculating a first loss value according to the first target discriminant value and the first reference discriminant value, and optimizing the first generator and the first converter according to the first loss value;

generating a second sample matrix according to the first sample matrix using a second generator of the image generation module;

generating a first sample grayscale image according to the second sample matrix using a second converter of the image generation module;

obtaining a second target discriminant value according to the first sample grayscale image and a second reference discriminant value according to the training image using a second discriminator of the image generation module, calculating a second loss value according to the second target discriminant value and the second reference discriminant value, and optimizing the second generator and the second converter according to the second loss value;

generating a third sample matrix according to the second sample matrix using a third generator of the image generation module;

generating a second sample grayscale image according to the third sample matrix using a third converter of the image generation module;

obtaining a third target discriminant value according to the second sample grayscale image and a third reference discriminant value according to the training image using a third discriminator of the image generation module, calculating a third loss value according to the third target discriminant value and the third reference discriminant value, and optimizing the third generator and the third converter according to the third loss value;

generating a fourth sample matrix according to the third sample matrix using a fourth generator of the image generation module;

generating a sample color image according to the fourth sample matrix using a fourth converter of the image generation module; and obtaining a fourth target discriminant value according to the sample color image and a fourth reference discriminant value according to the training image using a fourth discriminator of the image generation module, calculating a fourth loss value according to the fourth target discriminant value and the fourth reference discriminant value, and optimizing the fourth generator and the fourth converter according to the fourth loss value.

9. The computer device according to claim 8, wherein the at least one processor is further caused to perform operations comprising:

generating a first target matrix according to a target noise using the first generator;

generating a target contour image according to the first target matrix using the first converter;

generating a second target matrix according to the first target matrix using the second generator;

generating a first target grayscale image according to the second target matrix using the second converter;

generating a third target matrix according to the second target matrix using the third generator;

generating a second target grayscale image according to the third target matrix using the third converter;

generating a fourth target matrix according to the third target matrix using the fourth generator; and generating a target color image according to the fourth target matrix using the fourth converter.

10. The computer device according to claim 8, wherein the first loss value is calculated as follows:

$$D_{loss}=E_z(D(G(z)))-E_x(D(x))+GP,$$

$$GP=\lambda*E_{x\sim P(\tilde{x})}(\|\nabla_{\tilde{x}}D(x)\|_2-1)^2,$$

$$\tilde{x}=\varepsilon G(z)+(1-\varepsilon)*X,$$

wherein ε represents a random number between 0 and 1, λ is an empirical value, E denotes an expected value, x denotes the training image, D) denotes a result of the first discriminator, and G( ) denotes the sample contour image.

11. The computer device according to claim 8, wherein the sample noise is a 1×100 matrix, the first generator comprises a fully connected layer and four upsampling blocks, and a method of generating the first sample matrix according to the sample noise comprises:
- converting the 1×100 matrix to a 1×16384 matrix using the fully connected layer of the first generator;
- reconstructing the 1×16384 matrix to a 1024×4×4 matrix; and
- converting the 1024×4×4 matrix to a 64×64×64 first sample matrix using the four upsampling blocks of the first generator.

12. The computer device according to claim 11, wherein the second generator comprises a convolutional layer, a first residual block set, and an upsampling block, a method of generating the second sample matrix according to the first sample matrix comprises:
- performing a convolution operation on the 64×64×64 first sample matrix to obtain a first 64×32×32 matrix using the convolutional layer of the second generator;
- converting the first 64×32×32 matrix to a second 64×32×32 matrix using the first residual block set;
- stacking the first 64×32×32 matrix and the second 64×32×32 matrix in depth to obtain a 128×32×32 matrix; and
- converting the 128×32×32 matrix to a 64×64×64 second sample matrix using the upsampling block of the second generator.

13. The computer device according to claim 12, wherein the third generator comprises a second residual block set and an upsampling block, and a method of generating the third sample matrix according to the second sample matrix comprises:
- converting the 64×64×64 second sample matrix to a first 64×64×64 matrix using the second residual block set; and
- converting the first 64×64×64 matrix to a 32×128×128 third sample matrix using the upsampling block of the third generator.

14. The computer device according to claim 13, wherein the fourth generator comprises a convolutional layer, a third residual block set, and an upsampling block, and a method of generating the fourth sample matrix according to the third sample matrix comprises:
- performing a convolution operation on the 32×128×128 third sample matrix to obtain a first 32×64×64 matrix using the convolutional layer of the fourth generator;
- converting the first 32×64×64 matrix to a second 32×64×64 matrix using the third residual block set;
- stacking the first 32×64×64 matrix and the second 32×64×64 matrix in depth to obtain a second 64×64×64 matrix; and
- converting the second 64×64×64 matrix to a 32×128×128 fourth sample matrix using the upsampling block of the fourth generator.

15. A non-transitory storage medium having stored thereon instructions that, when executed by a computer device, causes the computer device to perform a method for training an image generation model, the method comprising:
- generating a first sample matrix according to a sample noise using a first generator of an image generation module;
- generating a sample contour image according to the first sample matrix using a first converter of the image generation module;
- obtaining a first target discriminant value according to the sample contour image and a first reference discriminant value according to a training image using a first discriminator of the image generation module, calculating a first loss value according to the first target discriminant value and the first reference discriminant value, and optimizing the first generator and the first converter according to the first loss value;
- generating a second sample matrix according to the first sample matrix using a second generator of the image generation module;
- generating a first sample grayscale image according to the second sample matrix using a second converter of the image generation module;
- obtaining a second target discriminant value according to the first sample grayscale image and a second reference discriminant value according to the training image using a second discriminator of the image generation module, calculating a second loss value according to the second target discriminant value and the second reference discriminant value, and optimizing the second generator and the second converter according to the second loss value;
- generating a third sample matrix according to the second sample matrix using a third generator of the image generation module;
- generating a second sample grayscale image according to the third sample matrix using a third converter of the image generation module;
- obtaining a third target discriminant value according to the second sample grayscale image and a third reference discriminant value according to the training image using a third discriminator of the image generation module, calculating a third loss value according to the third target discriminant value and the third reference discriminant value, and optimizing the third generator and the third converter according to the third loss value;
- generating a fourth sample matrix according to the third sample matrix using a fourth generator of the image generation module;
- generating a sample color image according to the fourth sample matrix using a fourth converter of the image generation module; and
- obtaining a fourth target discriminant value according to the sample color image and a fourth reference discriminant value according to the training image using a fourth discriminator of the image generation module, calculating a fourth loss value according to the fourth target discriminant value and the fourth reference discriminant value, and optimizing the fourth generator and the fourth converter according to the fourth loss value.

16. The non-transitory storage medium according to claim 15, wherein the first loss value is calculated as follows:

$$D_{loss}=E_z(D(G(z)))-E_x(D(x))+GP,$$

$$GP=\lambda * E_{x \sim P(\tilde{x})}(\|\nabla_z D(x)\|_2 - 1)^2,$$

$$\tilde{x}=\varepsilon G(z)+(1-\varepsilon)*X,$$

wherein ε represents a random number between 0 and 1, λ is an empirical value, E denotes an expected value, x denotes the training image, D( ) denotes a result of the first discriminator, and G( ) denotes the sample contour image.

17. The non-transitory storage medium according to claim 15, wherein the sample noise is a 1×100 matrix, the first generator comprises a fully connected layer and four upsampling blocks, and a method of generating the first sample matrix according to the sample noise comprises:
- converting the 1×100 matrix to a 1×16384 matrix using the fully connected layer of the first generator;

reconstructing the 1×16384 matrix to a 1024×4×4 matrix; and converting the 1024×4×4 matrix to a 64×64×64 first sample matrix using the four upsampling blocks of the first generator.

18. The non-transitory storage medium according to claim 17, wherein the second generator comprises a convolutional layer, a first residual block set, and an upsampling block, a method of generating the second sample matrix according to the first sample matrix comprises:

performing a convolution operation on the 64×64×64 first sample matrix to obtain a first 64×32×32 matrix using the convolutional layer of the second generator;

converting the first 64×32×32 matrix to a second 64×32×32 matrix using the first residual block set;

stacking the first 64×32×32 matrix and the second 64×32×32 matrix in depth to obtain a 128×32×32 matrix; and converting the 128×32×32 matrix to a 64×64×64 second sample matrix using the upsampling block of the second generator.

19. The non-transitory storage medium according to claim 18, wherein the third generator comprises a second residual block set and an upsampling block, and a method of generating the third sample matrix according to the second sample matrix comprises:

converting the 64×64×64 second sample matrix to a first 64×64×64 matrix using the second residual block set; and converting the first 64×64×64 matrix to a 32×128×128 third sample matrix using the upsampling block of the third generator.

20. The non-transitory storage medium according to claim 19, wherein the fourth generator comprises a convolutional layer, a third residual block set, and an upsampling block, and a method of generating the fourth sample matrix according to the third sample matrix comprises:

performing a convolution operation on the 32×128×128 third sample matrix to obtain a first 32×64×64 matrix using the convolutional layer of the fourth generator, converting the first 32×64×64 matrix to a second 32×64×64 matrix using the third residual block set;

stacking the first 32×64×64 matrix and the second 32×64×64 matrix in depth to obtain a second 64×64×64 matrix; and converting the second 64×64×64 matrix to a 32×128×128 fourth sample matrix using the upsampling block of the fourth generator.

\* \* \* \* \*